US010009711B2

(12) United States Patent
Sanders

(10) Patent No.: US 10,009,711 B2
(45) Date of Patent: Jun. 26, 2018

(54) MULTI-INPUT DIRECTIONAL COUPLER PRINTED CIRCUIT

(71) Applicant: TiVo Solutions Inc., San Carlos, CA (US)

(72) Inventor: Gary L. Sanders, Portland, OR (US)

(73) Assignee: TiVo Solutions Inc., San Jose, CA (US)

( * ) Notice: Subject to any disclaimer, the term of this patent is extended or adjusted under 35 U.S.C. 154(b) by 0 days. days.

(21) Appl. No.: 15/257,758

(22) Filed: Sep. 6, 2016

(65) Prior Publication Data

US 2018/0070196 A1    Mar. 8, 2018

(51) Int. Cl.
| | |
|---|---|
| *H04B 1/38* | (2015.01) |
| *H04M 1/00* | (2006.01) |
| *H04W 4/00* | (2018.01) |
| *H04J 11/00* | (2006.01) |
| *H04W 52/02* | (2009.01) |
| *H04W 88/08* | (2009.01) |

(52) U.S. Cl.
CPC ......... *H04W 4/008* (2013.01); *H04J 11/0023* (2013.01); *H04W 52/02* (2013.01); *H04W 88/08* (2013.01)

(58) Field of Classification Search
CPC ..... H04W 4/008; H04W 52/02; H04W 88/08; H04B 1/04
See application file for complete search history.

(56) References Cited

U.S. PATENT DOCUMENTS

| | | | | |
|---|---|---|---|---|
| 2001/0001548 A1* | 5/2001 | Ishida | ....................... | H01P 5/10 330/295 |
| 2004/0239438 A1* | 12/2004 | Benham | .............. | G06F 13/4086 333/24 R |
| 2004/0263281 A1* | 12/2004 | Podell | ..................... | H01P 5/185 333/116 |
| 2006/0044075 A1* | 3/2006 | Storniolo | ................ | H01P 5/185 333/116 |
| 2007/0129104 A1* | 6/2007 | Sano | .................... | H04B 7/0805 455/553.1 |
| 2008/0253345 A1* | 10/2008 | Sanguinetti | .......... | H01Q 1/2291 370/339 |

* cited by examiner

*Primary Examiner* — Nguyen Vo
(74) *Attorney, Agent, or Firm* — Haley Guiliano LLP

(57) ABSTRACT

Approaches, techniques, and mechanisms are disclosed for allowing multiple distinct and diverse wireless services (e.g., Wi-Fi, Bluetooth, Radio Frequency for Consumer Electronics (RF4CE), ZigBee, etc.) to share common frequencies while utilizing a single set of antennas. Among other potential benefits, the techniques may permit the sharing of common frequencies amongst multiple services with reduced (or no) interference amongst the services relative to conventional designs, which, depending on the embodiment, may increase performance, improving manufacturability, save design and material cost, and so forth. According to one embodiment, a multi-input directional coupler printed circuit may be implemented for multiple wireless services. This device may include a single directional coupler with reduced or no loss, placed in series with two combiners that provide high isolation for wireless signals. The device may thus allow multiple wireless services with potentially different protocols to share the same or different frequency bands using a single antenna.

15 Claims, 10 Drawing Sheets

FIG. 1
Communication System 100
Computer 102
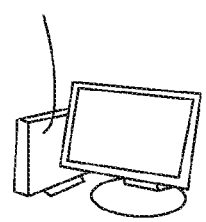
Display Device 104
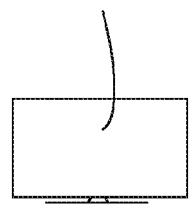
Access Point 110
Entertainment System 106
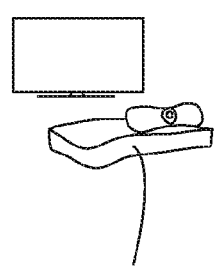
Mobile Device 108
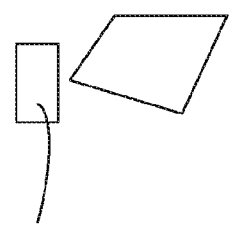

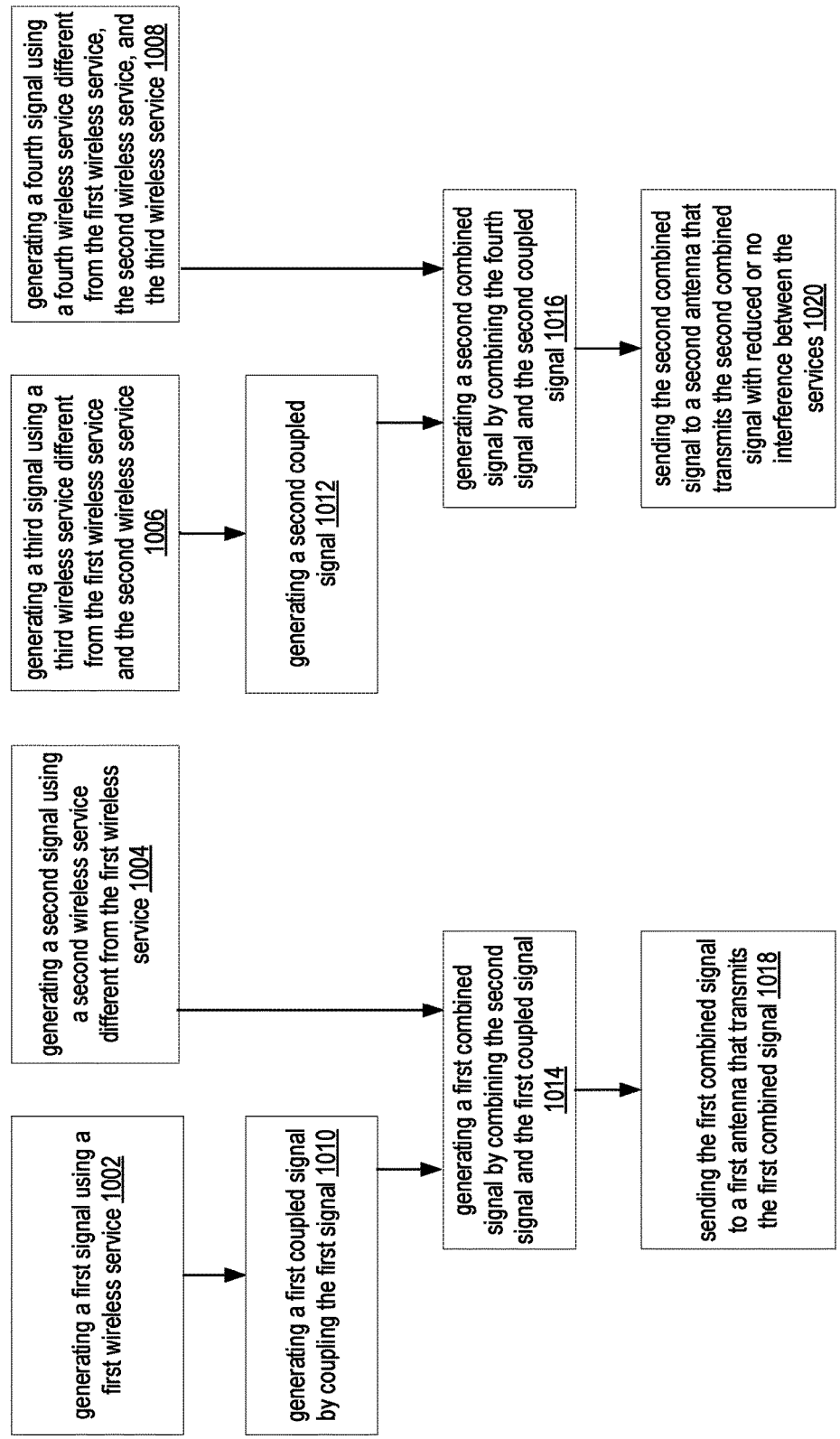

MULTI-INPUT DIRECTIONAL COUPLER PRINTED CIRCUIT

TECHNICAL FIELD

Embodiments relate generally to a communication system, and, more specifically, to techniques for wireless networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern electronic devices are often equipped with antennas for transmitting and receiving electromagnetic signals. These signals are typically transmitted and received at frequencies within the electromagnetic spectrum known as radio frequencies. Via these signals, electronic devices may communicate with each other.

Various protocols exist to facilitate such communications. For example, Wireless Fidelity (Wi-Fi) is a set of protocols commonly used by modern electronic devices, often to wirelessly connect to networks of devices, such as wireless Local Area Network (WLAN) networks or the Internet, traditionally using signals transmitted over the 2.4 gigahertz (GHz) and 5 GHz radio bands. The arrangement of antenna (or antennas) on a device equipped to communicate wirelessly is usually carefully configured to permit transmission and/or reception of signals using the protocols and frequencies that the device is designed to communicate over. Different antenna configurations may produce different results depending on the frequencies and/or protocols involved.

Devices that can use Wi-Fi technology include personal computers, video-game consoles, smartphones, digital cameras, tablet computers, video set-top boxes and dongles, and digital audio players. Wi-Fi compatible devices typically connect to networks via a device known as a wireless access point. A wireless access point comprises various antennas for communicating with one or more client devices within an effective coverage area, which varies depending on factors such as the transmitting power of the wireless access point, the transmitting power of the client devices, the configuration of the antenna(s) on the wireless access point and/or the client devices, interference from other signals and obstacles, and so forth. A wireless access point may further be coupled to various networks to permit the one or more devices to access those networks. Wi-Fi coverage for a given network can be as small as a single room with walls that block radio waves, or as large as many square kilometers, as may be achieved by using higher transmission powers, overlapping multiple access points, better antenna designs, and so forth.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an illustrative view of various aspects of an example communication system in which the techniques described herein may be practiced, according to an embodiment;

FIG. 10 illustrates an example process flow, in accordance with one or more embodiments.

DETAILED DESCRIPTION

Figure 2:
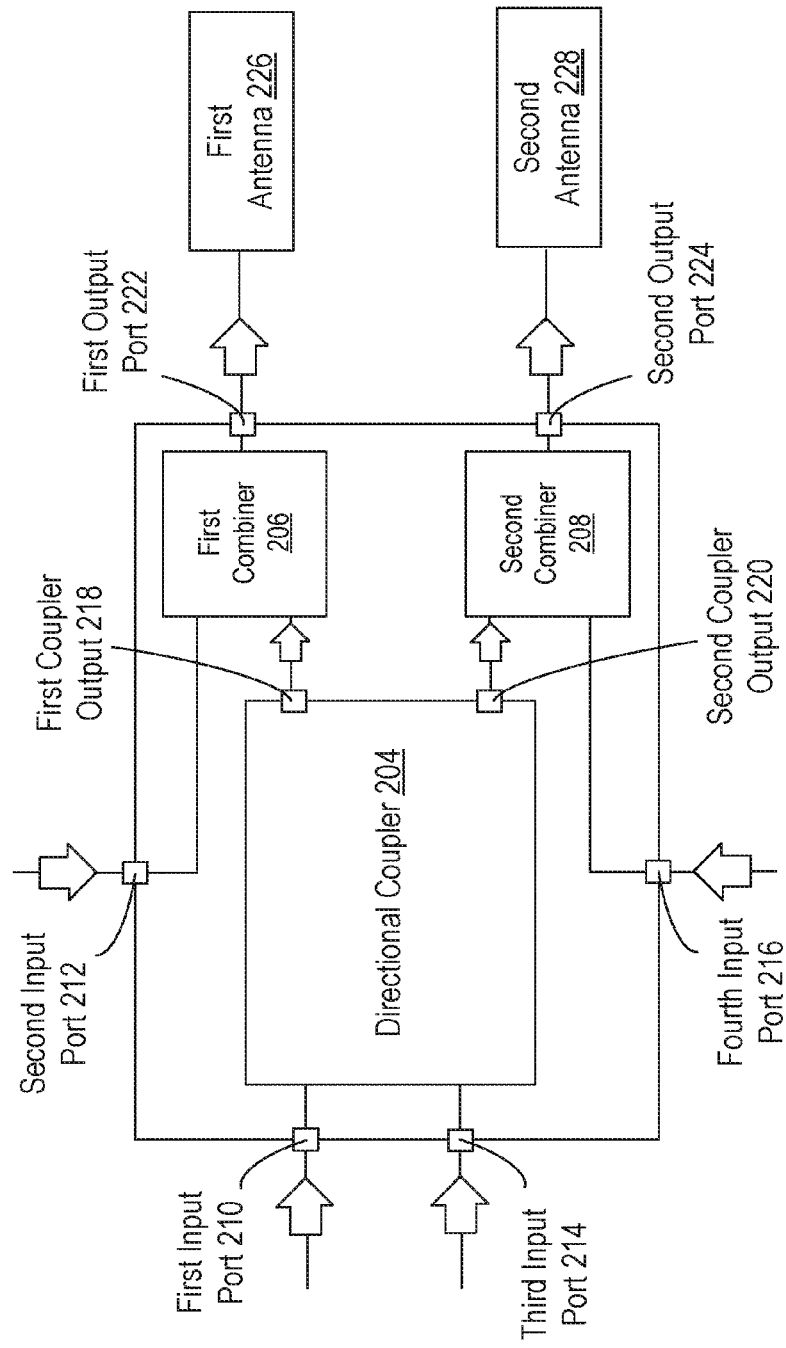
FIG. 2 is an example block diagram of a multi-input directional coupler printed circuit, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. System Overview
    3.0. Structural Overview
    4.0. Implementation Examples
    4.1. Example Directional Coupler
    4.2. Example Combiner
    4.3. Example Circuit
    4.4. Example Top Conductive Layer
    4.5. Example First Inner Layer
    4.6. Example Second Inner Layer
    4.7. Example Portion of Directional Coupler
    4.8. Example Process Flow
    5.0. Example Embodiments
    6.0. Extensions and Alternatives

1.0. GENERAL OVERVIEW

Approaches, techniques, and mechanisms are disclosed for allowing multiple distinct and diverse wireless services (e.g., Wi-Fi, Bluetooth, Radio Frequency for Consumer Electronics (RF4CE), ZigBee, etc.) to share common frequencies while utilizing a single set of antennas. Among other potential benefits, the techniques may permit the sharing of common frequencies amongst multiple services with reduced (or even no) interference amongst the services relative to conventional designs, which, depending on the embodiment, may increase performance, improving manufacturability, save design and material cost, and so forth. According to one embodiment, a multi-input directional coupler printed circuit may be implemented for multiple wireless services. This device may include a single directional coupler with reduced or no loss, placed in series with two directional coupler combiners that provide high isolation for wireless signals. The device may thus allow multiple wireless services with potentially different protocols to share the same or different frequency bands using a single antenna.

According to an embodiment, a parallel trap in series with each combiner may provide reduction or elimination of the combiner loss at a selected frequency.

According to an embodiment, by splitting the path of the first directional coupler into two paths and applying a serpentine delay in only one path, a 2-pole notch may be implemented that covers an entire frequency band. The two paths may provide high isolation over the entire frequency band. A trap (e.g., a parallel trap, an inductor-capacitor (LC) trap, etc.) is a separate technique from a "dual-path with serpentine on one path" trap to create a notch. For example, an LC trap is at 5 GHz, while a serpentine path is working at 2.4 GHz. The LC trap may include discrete components and reduce 5 GHz loss as an advantage, among other benefits. One may weigh these advantages and disadvantages for an LC trap to determine if it is used in any particular application. A serpentine notch may have no cost to implement, and therefore may be utilized in any application. The serpentine may be employed as a separate feature from the parallel trap.

According to an embodiment, except for discrete components (e.g., resistors, capacitors, etc.) in the directional combiners, the circuitry of the directional coupler and the directional combiners may be implemented with metal (e.g., copper, etc.) traces in a printed circuit board (PCB). This may simplify the solution and create a low cost solution that allows only one set of two wireless antennas to be used, thus, for example, eliminating the time and expense of engineering optimal placement of multiple antennas.

2.0. System Overview

FIG. 1 is an illustrative view of various aspects of an example communication system 100 in which the techniques described herein may be practiced, according to an embodiment. Communication system 100 comprises one or more computing devices configured to communicate using wireless signals, also referred to herein as wireless devices. These one or more computing devices comprise any combination of hardware and software configured to implement various logical components. For example, the one or more computing devices may include one or more memories storing instructions for implementing the various components, one or more hardware processors configured to execute the instructions stored in the one or more memories, and various data repositories in the one or more memories for storing data structures utilized and manipulated by the various components.

Communication system 100 may include any number of wireless devices that communicate with each other using wireless signals. For example, the wireless devices may include, but are not limited to, computer 102, display device 104, entertainment system 106, mobile device 108, access point 110, etc. Optionally, the wireless devices may communicate with one or more access points 110, through which they may communicate with each other and/or other devices on networks coupled to access point 110.

Computer 102 may be programmed to carry out a set of arithmetic or logical operations automatically. Since a sequence of operations can be readily changed, computer 102 may solve more than one kind of problem. Computer 102 may include at least one processing element, such as a central processing unit (CPU) or programmable hardware to execute operations, such as arithmetic or logic operations on data, as well as storing and retrieving results of the operations. Computer 102 may further comprise one or more memories to store instructions for executing the operations and/or the data to be utilized in the course of executing the operations. Computer 102 may further be coupled to one or more peripheral devices that enable computer 102 to accomplish various functions, such as accepting input data and generating output information. Such peripheral devices may include, for instance, keyboards, mice, cameras, microphones, remote controls, monitors, and so forth. Peripheral devices may be connected directly through wiring and/or wirelessly using a protocol such as Bluetooth or Wi-Fi.

Examples of computer 102 may include, without limitation, personal computers (PCs), desktop computers, laptops, notebooks, workstations, servers, diskless workstations and thin clients, hybrid computers, mainframes, supercomputers, microcomputers, nanocomputers, "smart" home appliances, consumer electronics, etc. In some embodiments, computer 102 may be an embedded computer. An embedded computer may provide special functionality implemented in, for example, automated teller machines (ATMs), cars, microwaves, televisions (TVs), digital video recorders (DVRs), other home electronics, and so forth.

Display device 104 is a device that outputs audio and/or visual presentations of data. The presented data may be generated by an internal computing device, computer 102, and/or any other device coupled to the display device 104. Display device 104 may be coupled to external devices by direct wiring and/or wirelessly. For example, display device 104 may receive data to present via a wireless display protocol, such as Miracast or other Wi-Fi Direct protocols.

Examples of display devices 104 may include mechanical televisions, electronic televisions, color televisions, smart televisions, three-dimensional (3D) televisions, rear-projection televisions, monitors, touch panels, projectors, virtual reality headsets, holographic projection devices, etc. Display device 104 may present information using any suitable display technologies, such as disk, cathode ray tube (CRT), digital light processing (DLP), plasma display, liquid crystal display (LCD), light-emitting diode (LED), organic light-emitting diode (OLED), etc. Further, for example, display device 104 may output data using any suitable standard, such as low-definition (LD), standard-definition (SD), high-definition (HD), ultra-high-definition (UHD), etc.

Entertainment system 106 may include interconnected video and/or audio equipment. In some embodiments, the equipment may be interconnected at least partially via wireless communications. Entertainment system 106 may include, for example, one or more media appliances that reproduce a movie theater experience and mood. In an embodiment, entertainment system 106 may combine capabilities of a computer 102 with applications supporting video playback, photo display, music playback, video recording functionality, video gaming functionality, and so forth. For example, entertainment system 106 may include cable and other set-top boxes (STB), game consoles, home theater systems, digital video disc (DVD) players, blue-ray players, compact disc (CD) players, speaker systems, sound bars, receivers, amplifiers, digital video recorders (DVRs), home theater PCs, etc.

Mobile device 108 is a special example of a computer 102 that is configured to be utilized predominately wirelessly. To this end, mobile device 108 has some portable power source, such as a built-in battery. In an embodiment, mobile device 108 is a handheld device. Mobile device 108 may have a display screen with touch input and/or a keyboard displayed on the screen or affixed below the screen. For example, mobile devices 108 may be, without limitation, smartphones, tablets, personal digital assistants (PDAs), handheld PCs, remote controls, cameras, media players, and so forth.

Access point 110 is networking hardware device that allows a wireless device to connect to a wired network. Access point 110 may connect to a router via a wired network as a standalone device, or access point 110 may instead be an integral component of a router. Access point 110 may provide a hotspot, which is a physical coverage area where Wi-Fi access (i.e. reception of wireless signals conforming to the Wi-Fi protocol) is available.

In an embodiment, any combination of computer 102, display device 104, entertainment system 106, mobile device 108, access point 110, etc., may communicate with each other using radio frequency (RF) signals. For example, any of computer 102, display device 104, entertainment system 106, mobile device 108, etc., may communicate directly with access point 110. Also, for example, computer 102, display device 104, entertainment system 106, mobile device 108, etc., may communicate with each other directly, through access point 110, and/or through other devices within system 100 (e.g. using a wireless "mesh").

For illustrative purposes, although computer 102, display device 104, entertainment system 106, mobile device 108, and access point 110 are shown as examples of devices that may be deployed within a system 100, it is understood that a communication system 100 may in fact include any combination of devices that use wireless communication to transfer information over the air between two or more points that are not connected by electrical conductors. Wireless communications among the devices may travel over the air via any suitable electromagnetic waves, such as radio frequency waves, infrared waves, visible light waves, etc. Also, for example, wireless communications among the devices may operate with or without regulations from Federal Communications Commission (FCC) or any other government agencies.

Communication system 100 may include wireless devices for various types of fixed, mobile, or portable applications. For example, communication system 100 may include devices, such as two-way radios, cellular telephones, personal digital assistants (PDAs), and wireless networking equipment, etc. Also, for examples, communication system 100 may include devices of radio wireless technology, such as Global Positioning System (GPS) units, garage door openers, wireless computer mice, keyboards, network cards, wireless routers, headsets, headphones, radio receivers, satellite television, broadcast television, cordless telephones, etc.

The devices within communication system 100 may communicate wirelessly using any communication protocol that connects multiple computers and devices together without wires. For example, communications within communication system 100 may take place using, without limitation, Bluetooth, Near-field communication (NFC), Worldwide Interoperability for Microwave Access (WiMAX), ZigBee, RF4CE, Z-Wave, Wi-Fi, etc. In an embodiment, Wi-Fi communications may incorporate IEEE 802.11 standards, such as 802.11g, 802.11n, 802.11ac, etc. Bluetooth and ZigBee communications, meanwhile, may incorporate IEEE 802.15 standards. A variety of other communication standards may be supported, depending on the embodiment.

Communication system 100 illustrates only one of many possible arrangements of components configured to provide the functionality described herein. Other arrangements may include fewer, additional, or different components, and the division of work between the components may vary depending on the arrangement. For example, in some embodiments, computer 102 may be omitted, along with any other components relied upon exclusively by the omitted component(s).

3.0. STRUCTURAL OVERVIEW

Conventionally, devices such as found in system 100 may use at least two antennas for directional steering of Wi-Fi signals to a hub. In addition, these devices may use other protocols (e.g., Bluetooth, RF4CE, etc.) that are also on the same frequency bands (e.g., 2.4 GHz, etc.), each with separate single antennas. These services (i.e., Wi-Fi, Bluetooth, RF4CE, etc.) may interfere with each other and so placement of the multiple antennas may be done very carefully to achieve satisfactory operation.

For example, an electronic device may have a set of two 802.11 Wi-Fi antennas that mount onto a chassis, connected to the main PCB with miniature coaxial cables. The STB may also use Bluetooth and RF4CE for wireless remote controls. Each of these services may use its own separate antenna. A set of two antennas may be used for 802.11 Wi-Fi because the Transmit and Receive ICs use a beam steering method for phase shifting of the two antennas to maximize a range to a wireless hub at home. These antennas may represent separate small printed circuit modules that are held in place on the chassis with plastic brackets and adhesive foam tape. This results in significant added manufacturing costs.

The beam steering method changes the direction of the main lobe of a radiation pattern of an RF signal. In radio systems, beam steering may be accomplished by switching antenna elements or by changing the relative phases of RF signals driving the antenna elements. In a radio antenna's radiation pattern, the main lobe or the main beam is the lobe that has the maximum power. This is the lobe that exhibits the greatest field strength.

In order to improve performance, separate antennas may need to have at least a predetermined amount of isolation from each other. For example, separate Bluetooth and RF4CE antennas may have to include at least 30 dB of minimum isolation from each other and from Wi-Fi antennas. More isolation may be included to maximize operating distances of these three services. In a small electronic device, such as an STB, it may be very difficult to achieve the minimum isolation.

As an example, a ¼ wavelength of a 2.4 GHz signal in air is approximately 1¼ inches ("), which is approximately half of that with a PCB trace. Interfacing to air refers to a length of an antenna that is referenced to air. Because the length is approximately 1¼ inches, and isolation is in the form of a sharp frequency null, it may be practically impossible to consistently maximize the level of isolations in manufacturing. Even slight differences in the positioning of the coaxial cables and antenna modules may shift the null frequency, reducing the isolation significantly. The positioning of the antennas and the coaxial wiring thus becomes very critical. The costs of including multiple antennas and their associated coaxial cables with miniature RF connectors (e.g., U.FL, etc.) is thus a significant burden on the manufacturing of such devices.

By way of contrast to these and other conventional devices, in embodiments utilizing techniques described below, wireless communication capabilities are provided for wireless devices using techniques that involve sharing frequencies for multiple wireless channels using a single set of antennas, simplifying antenna placement and other manufacturing concerns. Example structural configurations of such devices are now described.

FIG. 2 illustrates an example block diagram of a multi-input directional coupler printed circuit 202, according to an embodiment. Multi-input directional coupler printed circuit 202 may be implemented in any devices. For example, multi-input directional coupler printed circuit 202 may be implemented in devices, but are not limited to, any of: computer 102, display device 104, entertainment system 106, mobile device 108, access point 110, etc.

Multi-input directional coupler printed circuit 202 may be physically implemented using a structure of a printed circuit board (PCB), a substrate, an interposer, etc. Multi-input directional coupler printed circuit 202 may allow multiple distinct or diverse wireless (e.g., Wi-Fi, Bluetooth, RF4CE, ZigBee, etc.) band services to share common frequencies with reduced or no interference, while utilizing a single set of antennas instead of a separate antenna for each service.

As used herein, a wireless service is a mechanism for communicating signals that conform to a specific protocol, or group of protocols, over a specific set of or more frequency bands. In some cases, different services may provide communications for the same protocol or protocol group, on account of the fact that the protocol or protocol group may be utilized in entirely different frequency bands. For example, the 802.11n protocol may be used for signals in multiple frequency bands, such as the 2.4 GHz band and the 5 GHz band, while the 802.11ad protocol may be used in 2.4, 5, and 60 GHz bands. Hence, different services may communicate signals conforming to the same protocol but different frequency bands. In some embodiments, a single service may also communicate signals conforming to different protocols, but over a single frequency band. In an embodiment, different services may communicate over the same frequency band, but using different protocols or protocol groups.

Multi-input directional coupler printed circuit 202 may include a combination of a number of directional couplers (e.g., directional coupler 204, etc.), a number of combiners (e.g., first combiner 206, second combiner 208, etc.), etc. In an embodiment, multi-input directional coupler printed circuit 202 may include only one directional coupler 204 or only two combiners (e.g., first combiner 206 and second combiner 208). In an embodiment, multi-input directional coupler printed circuit 202 may include at least one directional coupler 204 or at least two combiners (e.g., first combiner 206, second combiner 208, etc.).

Directional coupler 204 may include a component that can be used in the field of radio technology. Directional coupler 204 may include any number of passive elements (e.g., capacitors, resistors, etc.). Directional coupler 204 may couple a signal in a transmission line to an output port to enable the signal to be used in another circuit. Directional coupler 204 may be constructed from two coupled transmission lines set close together such that energy passing through one transmission line can be coupled to the other transmission line.

For example, directional coupler 204 may be implemented using a variety of techniques including, but not limited to, any of: stripline, coaxial feeder, lumped or discrete elements, etc. Also, for example, directional coupler 204 may be implemented within a variety of packages including, but not limited to, any of: packages with RF connectors, packages with solder pins, etc.

For example, directional coupler 204 may be implemented on a substrate carrier, a PCB, an interposer, etc. Also, for example, directional coupler 204 may be constructed as part of another unit or component.

Combiners, such as first combiner 206 and second combiner 208, may include components that can be used in the field of radio technology. Each combiner may include any number of passive elements (e.g., capacitors, resistors, etc.). Combiners may combine power from a number of signals. Combiners may be used for sending signals along a single feeder. Combiners may be used for circuits that combine RF signals together.

Multi-input directional coupler printed circuit 202 may include any number of input ports, such as first input port 210, second input port 212, third input port 214, fourth input port 216, etc. Each input port may receive any types of RF signals. In an embodiment, some or all input ports may be configured to receive signals for different wireless services.

Directional coupler 204 may be placed or connected in series with two directional coupler combiners, such as first combiner 206 and second combiner 208, that provide a predetermined isolation between input ports (e.g., first input port 210, second input port 212, third input port 214, fourth input port 216, etc.). An isolation of signals may be predetermined such that the signals may be separate by a distance so that an operation of one signal may not affect an operation of another signal.

In an embodiment, first input port 210 may receive a signal for a first wireless service but not a second wireless service, while second input port 212 may receive a signal using the second wireless service but not the first wireless service. Both of the signals may be coupled or combined using first combiner 206 to generate a combined signal. The combined signal may be sent to first antenna 226 so that these signals may share a single antenna in the same frequency band. For example, the second wireless service may communicate signals conforming to an 802.11 Wi-Fi standard, while the first wireless service may be for a different service or protocol, such as Bluetooth, RF4CE, ZigBee, etc.

In an embodiment, third input port 214 may receive a signal using a third wireless protocol but not a fourth wireless service, while fourth input port 216 may receive a signal using the fourth wireless service, but not the third wireless service. Both of the signals may be coupled or combined using second combiner 208 to generate a combined signal. The combined signal may be sent to second antenna 228 so that these signals may share a single antenna. For example, the fourth wireless service may be for an 802.11 Wi-Fi standard, on a different frequency band than the second wireless service, while the third wireless service may be for a different service or protocol, such as Bluetooth, RF4CE, ZigBee, etc.

Second input port 212 and fourth input port 216 may be configured to receive signals conforming to the same wireless protocol or different wireless protocols, depending on the embodiment. In either event, each of the signals received by second input port 212 and fourth input port 216 may be processed by multi-input directional coupler printed circuit 202 and subsequently sent to separate output ports, such as first output port 222, second output port 224, etc. In an embodiment, second input port 212 may receive a signal using a frequency band, while fourth input port 216 may receive a signal using another frequency band different from the frequency band used for second input port 212. For example, second input port 212 may receive a Wi-Fi signal using a 2.4 GHz frequency band, and fourth input port 216 may receive another Wi-Fi signal using a 5.0 GHz frequency band.

In an embodiment, signals from first input port 210 and third input port 214 are coupled to first coupler output 218 and second coupler output 220, respectively, using directional coupler 204 before proceeding to first combiner 206 and second combiner 208, respectively. In an embodiment, to minimize signal loss, directional coupler 204 does not combine the signals as output, but rather leaves them isolated. However, in other embodiments this need not be the case.

First combiner 206 may combine signals from second input port 212 and first coupler output 218, and send a combined signal to first output port 222. Second combiner 208 may combine signals from second coupler output 220 and fourth input port 216, and send a combined signal to second output port 224. First output port 222 and second output port 224 may be directly connected to first antenna 226 and second antenna 228, respectively.

Input ports (e.g., 210, 212, 214, 216, etc.) may receive Wi-Fi service signals (e.g., 802.11, etc.) or non-Wi-Fi service signals (e.g., Bluetooth, RF4CE, ZigBee, etc.). For example, in one embodiment, second input port 212 may receive a Wi-Fi signal in the 2.4 GHz band, fourth input port 216 may receive another Wi-Fi signal in the 5 GHz band, first input port 210 may receive a Bluetooth signal, and third input port 214 may receive an RF4CE signal. However, in other embodiments, different services may be mapped to different input ports.

In an embodiment, circuit 202 is implemented with a predefined number of discrete passive parts or components and a specially designed printed circuit layout that provides the isolation between the signals. For example, the predefined number of discrete passive parts may be any number, such as four, etc. The specially designed printed circuit layout may be implemented for a printed circuit board (PCB) device. For example, the PCB device may be implemented onto a Wi-Fi antenna PCB or a daughtercard. This device may be manufactured, potentially very inexpensively relative to conventional designs, for any system using Wi-Fi services with any selective frequency bands (e.g., 2.4 GHz, 3.6 GHz, 5.0 GHz, 60 GHz, etc.).

In an embodiment, there may be a predefined power loss (e.g., 3 dB, etc.) in a frequency band but no power loss in another frequency band. For example, there may be a 3 dB loss for the 2.4 GHz Wi-Fi frequency band, but there may not be any power loss in the 5.0 GHz frequency band. In such an embodiment, the 3 dB loss may be made up or compensated for by the high isolation of at least 40-60 dB obtained by multi-input directional coupler printed circuit 202. The high isolation may be adequate to allow the antennas achieve a predefined signal quality level.

In an embodiment, the design of multi-input directional coupler printed circuit 202 may permit at least 30 dB of isolation without the trouble of finding the optimum compromise to antenna positioning. With multi-input directional coupler printed circuit 202, a device may include a single set of antennas wherever convenient (e.g., anywhere within an electronic device casing). For example, the antennas may be built into the main printed circuit board, further reducing cost and complexity.

As an example, a Bluetooth signal may feed one of the Wi-Fi antennas, and an RF4CE signal would feed the other Wi-Fi antenna. Bluetooth and RF4CE integrated circuits may be designed for single antennas. Feeding these services to both antennas may create frequency nulls, leading to degraded performance. In an embodiment, isolation between the services of at least 40 dB and Wi-Fi may be included to improve performance on all services, while using only two antennas.

In an embodiment, multi-input directional coupler printed circuit 202 may include functionality with at least three wireless services and isolation between all three services so that only two antennas need be included. For example, multi-input directional coupler printed circuit 202 may include a stand-alone PCB with UF.L connectors. Also, for example, the size of the circuitry may be of any dimensions, with any number of conductive layers, any number of substrate layers, and may be fully shielded from electromagnetic interference (EMI) ingress and egress. In an embodiment, one example circuit 202 is a PCB, or portion thereof, having dimensions substantially similar to 0.75" by 0.3", with four copper layers, and three substrate layers. However, in other embodiments, satisfactory results may be achieved on PCBs of other dimensions with other numbers of conductive and substrate layers. A stripline configuration with modest isolation may be turned into a waveguide with much higher isolation by using an optimized dielectric thickness to tune the waveguide. For example, this stripline configuration may be used to implement a directional coupler, such as directional coupler 204.

In an embodiment, a number of internal blocks (e.g., 204, 206, 208, etc.) of multi-input directional coupler printed circuit 202 may provide a predetermined amount of isolation between input ports (e.g., 210, 212, 214, 216, etc.). For example, the predetermined amount of isolation may be at least 40 db.

In an embodiment, a number of antenna ports (e.g., 222, 224, etc.) may have a predetermined amount of isolation between themselves. For example, the antenna ports may have at least 60 dB of isolation between each other. A directional coupler and a combiner may only provide high isolation of transmitters. Receive isolation may be significantly less. However, it is transmit isolation that may be more important (e.g., than receive isolation) because a transmit power may be so large with the different services going into a directional coupler device. Receive signals may have much lower signal levels.

In an embodiment, each combiner, such as first combiner 206 or second combiner 208, may be implemented using a PCB microstrip. A microstrip may be a type of electrical transmission line, which may be fabricated using a printed circuit board technology. A microstrip may be used to carry microwave-frequency signals. For example, a microstrip may be implemented by a conducting metal strip separated from a ground plane by a dielectric layer, such as a substrate, etc. Also, for example, a combiner may be a component formed from a microstrip, with the entire component formed by a pattern of metallization on a substrate.

In an embodiment, a combiner may have a predetermined isolation at a frequency band between its input ports. Isolation may depend on a length of a trace on a PCB. For example, a combiner may achieve a predetermined optimal isolation between its input ports at 2.4 GHz due to a length of a trace of a ¼ wavelength. This isolation may be only at one frequency based upon the trace length of ¼ wavelength. The isolation may also have approximately 3 dB, or more, of loss. Also, for example, at 5 GHz, where the services may not share the frequency band, this loss may be undesirable and may be reduced as shown later. Wi-Fi transmitters may have adjustable RF output levels, and so this loss may be compensated for.

In an embodiment, multi-input directional coupler printed circuit 202 may include directional coupler 204 having a single 2-layer directional coupler with reduced or no power loss, placed in series with two directional coupler combiners (e.g., 206 or 208) that provide a predetermined isolation. For example, multi-input directional coupler printed circuit 202 may include a frequency notch or trap, having a parallel inductor or capacitor type of tuned circuit, in series with a combiner to eliminate a loss (e.g., 3 dB, etc.) of the combiner at a frequency (e.g., 5.0 GHz, etc.).

FIG. 2 illustrates only one possible arrangement for multi-input directional coupler printed circuit 202. Other embodiments may include fewer, additional, or different elements, in varying arrangements. For example, in some embodiments, a combiner may be omitted, along with any other elements relied upon exclusively by the omitted element(s). As another example, in an embodiment, circuit 202 may further include an addition of any combination of input ports, directional couplers, combiners, output ports, etc., to support additional wireless services that share frequency bands, antennas, etc.

4.0. IMPLEMENTATION EXAMPLES

4.1. Example Directional Coupler

Figure 3:
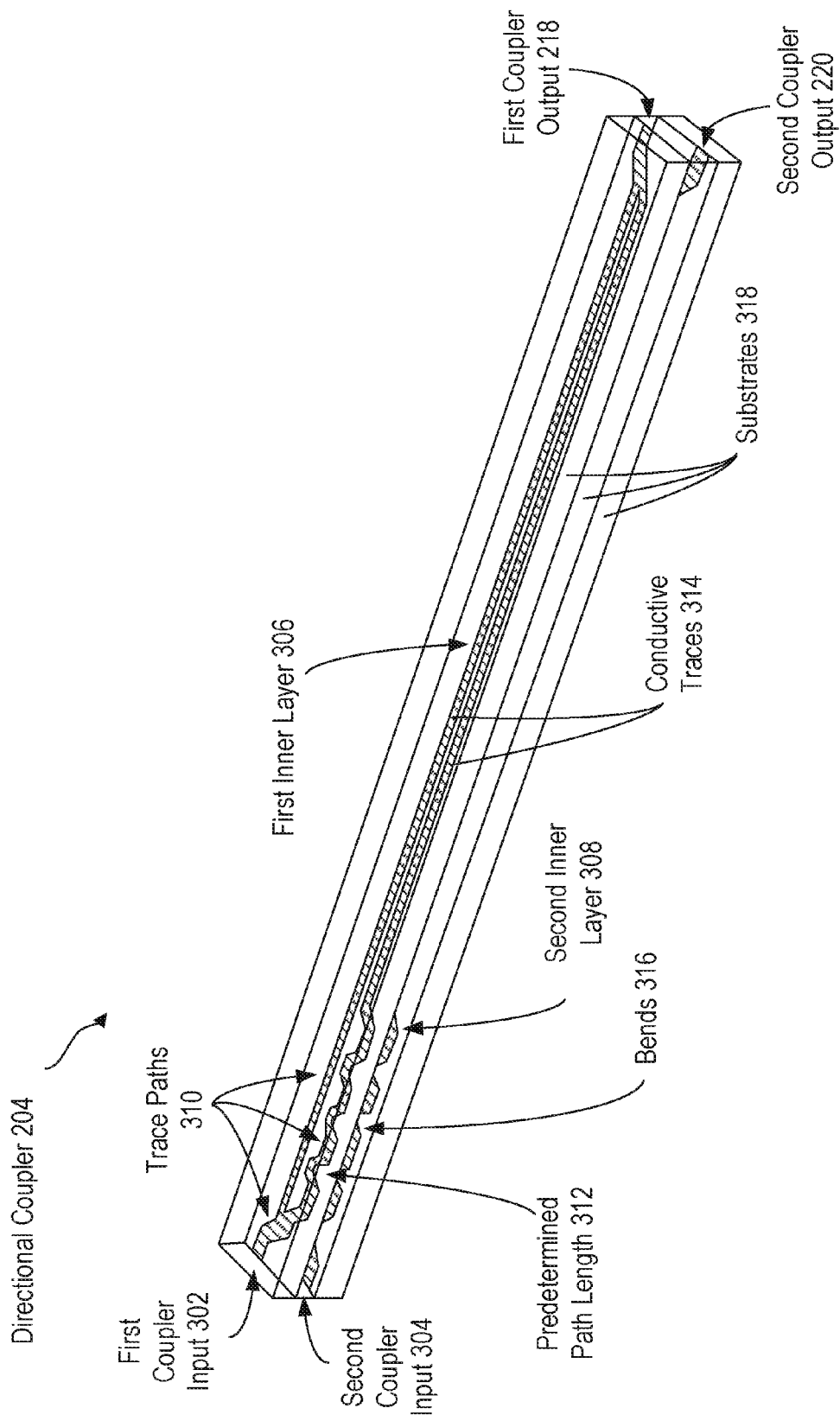
FIG. 3 is an isometric plan view of an example directional coupler, according to an embodiment.

FIG. 3 is an isometric plan view of an example directional coupler 204, according to an embodiment. The isometric plan view depicts an example of a structure of directional coupler 204. For illustrative purposes, the isometric plan view depicts directional coupler 204 without top and bottom conductive layers. The coupler 204 depicted in FIG. 3 is but one example of a coupler suitable for practicing the techniques described herein. Other couplers may include fewer, additional, or different elements in potentially varying arrangements.

Directional coupler 204 may be implemented from transmission lines that are coupled or set close enough together such that energy passing through one transmission line may be coupled to the other transmission line. In an embodiment, directional coupler 204 may be implemented as a single 2-layer directional coupler with reduced or no power loss of signals received from input ports, such as first coupler input 302, second coupler input 304, etc. First coupler input 302 and second coupler input 304 may be directly driven by signals received from first input port 210 and third input port 214 of multi-input directional coupler printed circuit 202, respectively. For example, only two layers, such as first inner layer 306 and second inner layer 308, may be allowed. This is because each layer couples to all other layers. Therefore, a third layer can only couple to the layer adjacent to it, and not to the layer on the other side of the adjacent layer, and so forth.

In an embodiment, directional coupler 204 may be implemented using only two trace paths 310 for electrical connectivity. For example, directional coupler 204 may include two trace paths 310 in each inner layer, such as first inner layer 306 or second inner layer 308. A trace path 310 may be split into two separate paths, with one path having a predetermined path length 312 that is greater than a length of the other path. Predetermined path length 312 may include any numerical value. The lengths of two trace paths 310 may be very similar. Trace paths 310 may be coupled with each other. A trace path 310 without bends 316 is shorter than a trace path 310 with bends 316. For example, trace paths 310, either with or without bends 316, may be multiples of ½ wavelength. However, this may result in greater losses, and so may be unlikely to be implemented. A trace path 310 with a serpentine trace with bends 316 may have sufficient distance from a trace path 310 without a serpentine trace, over a distance of the serpentine, or the traces will couple too much removing the effective additional path length of a serpentine. Physical isolation of the serpentine may be employed for operation of a double-notch. For example, predetermined path length 312 may include a numerical value of, but not limited to, ½ wavelength of a signal received from a coupler input port, such as first coupler input 302 or second coupler input 304.

First coupler output 218 and second coupler output 220 may be separate ports. In an embodiment, first coupler output 218 and second coupler output 220 are not combined since signals sent to first coupler output 218 and second coupler output 220 may not share the same antenna or the same frequency band. At least one reason why coupler outputs are not combined is to eliminate, for example, the normal 3 dB loss and provide addition isolation (i.e., a deeper notch) than that provided by a combiner. As such, signals from first coupler output 218 or second coupler output 220 may be sent to a separate antenna combiner, such as first combiner 206 or second combiner 208. If a signal (e.g., for Bluetooth, RF4CE, ZigBee, etc.) received from a coupler input port (e.g., first coupler input 302, second coupler input 304, etc.) were output to both antennas through both coupler output ports (e.g. first coupler output 218 and second coupler output 220), it may in certain configurations create interference patterns that can create nulls at numerous horizontal angles around the antennas, therefore compromising the range of operation of the antennas. Of course, embodiments are not limited to such configurations, and in other embodiments the signals may be combined.

In each of first inner layer 306 and second inner layer 308, conductive traces 314 may be formed. One conductive trace 314 may be formed in one trace path 310, and another conductive trace 314 may be formed in another trace path 310. Conductive traces 314 may represent physical structures of electrical interconnections for transmission of electrical signals.

In first inner layer 306, conductive traces 314 may be connected with each other at first coupler input 302 and first coupler output 218. Further, in first inner layer 306, conductive traces 314 may be connected to first coupler input 302 and first coupler output 218. Further, in first inner layer 306, conductive traces 314 may be formed parallel with each other between first coupler input 302 and first coupler output 218.

In second inner layer 308, conductive traces 314 may be connected with each other at second coupler input 304 and second coupler output 220. Further, in second inner layer 308, conductive traces 314 may be connected to second coupler input 304 and second coupler output 220. Further, in second inner layer 308, conductive traces 314 may be formed parallel with each other between second coupler input 304 and second coupler output 220.

In each inner layer, such as first inner layer 306 or second inner layer 308, one conductive trace 314 may have bends 316. A bend 316 may represent a portion of a conductive trace 314 that is formed at an angle with another portion of the conductive trace 314. In an embodiment, only one conductive trace 314 may include bends 316, and the other conductive trace 314 may not have any bends 316.

In an embodiment, conductive traces 314 in first inner layer 306 may be implemented using the same method as that of conductive traces 314 in second inner layer 308. For example, conductive traces 314 in first inner layer 306 may include the same structures as those of conductive traces 314 in second inner layer 308. Also, for example, conductive traces 314 in first inner layer 306 may be directly over conductive traces 314 in second inner layer 308. Further, for example, one conductive trace 314 in first inner layer 306 may include the same number of bends 316 as another conductive trace 314 in second inner layer 308.

Conductive traces 314 may be formed of any electrically conductive materials. For example, each conductive trace 314 may be formed with a strip of a conductive material including, but is not limited to, copper, any other metals, metallic compounds, etc.

Signals transported on conductive traces 314 may be separated by substrates 318, each having a predetermined thickness. The thickness may be predetermined to have a distance between layers that may allow directional coupler 204 to operate without any degradation or interference between signals.

For example, in one embodiment, each substrate 318 may have a predetermined thickness of approximately 20 mils, where a mil is a measurement that equals one-thousandth of an inch. As such, directional coupler 204 may have a thickness of approximately 63 mils, which may include thicknesses of a combination of conductive traces 314, adhesive materials used to attach conductive traces 314 to substrates 318, ground layers, etc. Each conductive trace 314 may two trace paths 310 of different lengths that may be combined at an output port (e.g., first coupler output 218, second coupler output 220, etc.) for each signal. However, in other embodiments the thickness of the substrates and/or directional coupler 204 may vary.

In an embodiment, a difference between lengths of trace paths 310 in each layer may cause a double-notch of isolation. The double-notch may refer to predefined ranges of two frequencies of an electrical circuit (e.g., filter, etc.) that passes signals within the predefined ranges of the two frequencies and rejects or attenuates frequencies outside of the predefined ranges.

In an embodiment, a conductive trace 314 may have bends 316, while another conductive trace 314 may not have any bends 316 to form a difference between lengths of trace paths 310. A conductive trace 314 may have bends 316, which form squiggles back and forth. Bends 316 may cause a trace path 310 longer than another trace path 310. When a structure of a conductive trace 314 is bent back and forth to make the conductive trace 314 linearly shorter, bends 316 may change a path length of each side of the conductive trace 314 just as a racing track is longer on the outside than on the inside.

Directional coupler 204 may include a predetermined thickness of each substrate 318 or predetermined widths of conductive traces 314. The predetermined thickness or the predetermined widths may be predetermined for frequencies such that deepest notches may occur at the frequencies on an isolation curve. The deepest notches may have the highest magnitudes compared to other frequencies on the isolation curve. The deepest notches may occur within the predefined ranges of the frequencies where directional coupler 204 pass the signals.

In an embodiment, directional coupler 204 may include top and bottom layers (not shown) formed with conductive materials. The top and bottom layers may be formed at top and bottom sides of directional coupler 204, respectively. First inner layer 306 and second inner layer 308 may be formed between the top and bottom layers. The top and bottom layers may be connected to ground. Having the top and bottom layers grounded may make directional coupler 204 self-shielding, which may include a feature that protects signals on first inner layer 306 or second inner layer 308 from electromagnetic interference (EMI) or radio-frequency interference (RFI).

Directional coupler 204 may be designed with any value for predetermined path length 312 of a conductive trace 314 that includes bends 316, depending on the embodiment. For example, in one embodiment, directional coupler 204 may be designed with predetermined path length 312 of ½ wavelength at 2.4 GHz. With this path length, directional coupler 204 may not have any power loss, other than power losses of conductive traces 314 and substrates 318, which may be minimal or only in a range of approximately tenths of a decibel (dB). Also, for example, at 2.4 GHz, in certain embodiments, but not necessarily all embodiments, a predetermined path length 312 of ¼ wavelength may be avoided so as to avoid signal loss. In other embodiments, yet other path lengths may be utilized.

For example, a design of a directional coupler, such as directional coupler 204, may be twice as long as a usual or conventional directional coupler. A classic or conventional directional coupler may have a ¼ wavelength coupled trace length. In comparison to the conventional directional coupler, directional coupler 204 may have a deeper notch using a ½ wavelength coupling deign. Directional coupler 204 may have a stripline design, with approximately equal spacing between conductive layers, including grounds, optimized for the deepness of the notch, with a trace width adjusted for optimal impedance matching. As an example, this spacing may also result in a waveguide type of performance, because a notch depth is maximum with a 20-mil spacing, and is reduced if the spacing goes up or down. One would expect the best coupling would be achieved with a very close spacing between two active traces, with a distance to grounds determined by best or optimal impedance matching. However, this close spacing may result in a very shallow notch depth. For example, a microstrip design may have air above traces, and a PCB substrate below the traces, having two different dielectric constants may compromise performance, also at least because of edge coupling rather than using the entire width of the traces for coupling, as in a stripline design. So, a stripline design may be used to get the best or optimal coupling and deepest notch.

In an embodiment, signals input to directional coupler 204 may be isolated by a predetermined amount in directional coupler 204. For example, signals input to first coupler input 302 or second coupler input 304 may be isolated by at least, but is not limited to, 40 dB, etc. Each signal input to directional coupler 204 may be coupled to only one output port of directional coupler 204 (e.g., first coupler output 218, second coupler output 220, etc.) so that the signal may be sent to a separate antenna.

4.2. Example Combiner

Figure 4:
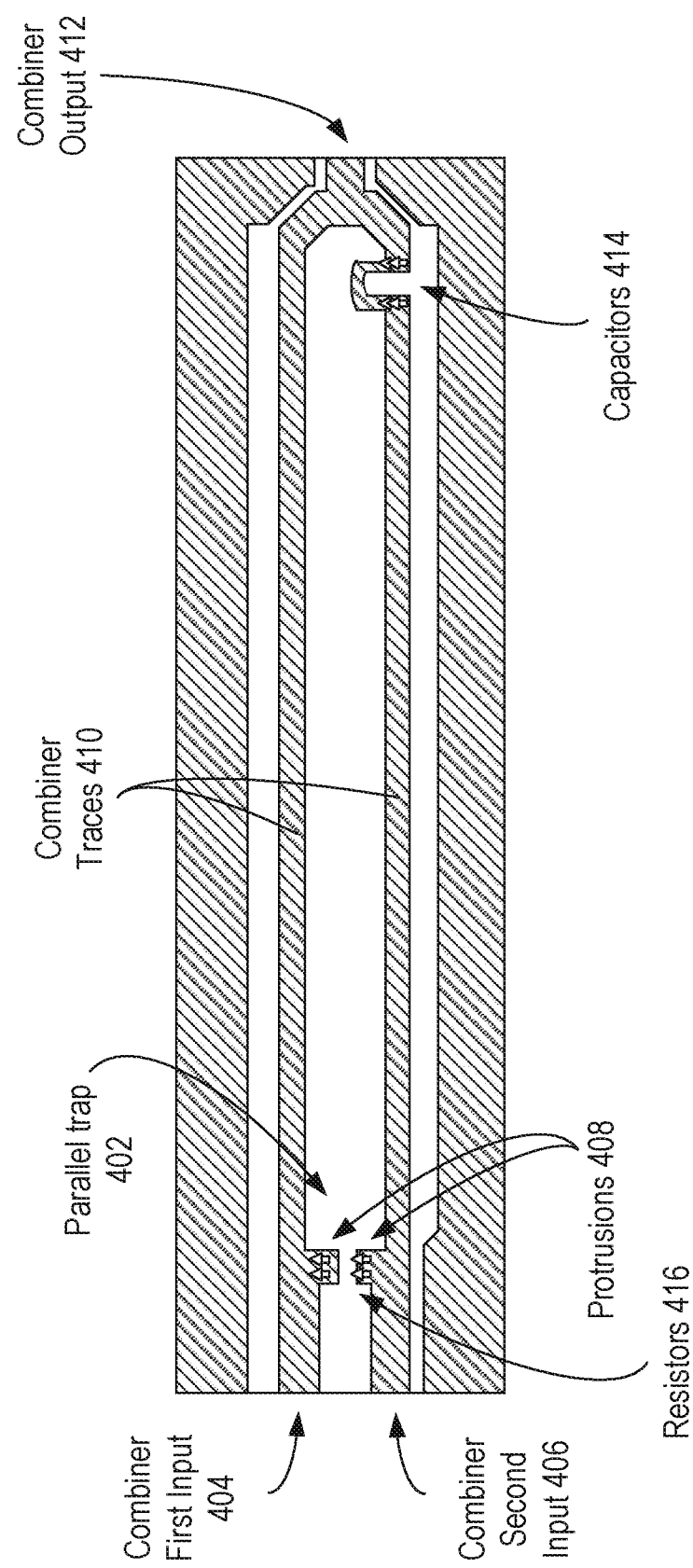
FIG. 4 is a top view of an example combiner, according to an embodiment.

FIG. 4 is a top view of an example combiner, according to an embodiment. The top view depicts an example of a PCB structure of the combiner. The combiner may represent any of first combiner 206 or second combiner 208. The combiner depicted in FIG. 4 is but one example of a coupler suitable for practicing the techniques described herein. Other combiners may include fewer, additional, or different elements in potentially varying arrangements.

In an embodiment, a combiner may be implemented using a microstrip structure for combining signals with the predetermined isolation within the predefined ranges of the frequencies where directional coupler 204 passes the signals. A combiner may include a single-notch of isolation. The single-notch may refer to a predefined range of a single frequency of an electrical circuit (e.g., filter, etc.) that passes signals within the predefined range of the single frequency and rejects or attenuates frequencies outside of the predefined range. The single-notch may be implemented if, for example, the directional coupler 204 has the double-notch because a width of the double-notch may be wide enough to include the single-notch of the combiners within production tolerances of a PCB.

In an embodiment, the combiner may include parallel trap 402, which may represent a structure of a circuit with shunt components. Parallel trap 402 may be implemented such that its impedance may be small at a frequency for which a circuit is tuned, and so parallel trap 402 may function as a short and may bypass a signal to ground at the frequency to be rejected.

Parallel trap 402 may be formed to eliminate a power loss of a signal at a frequency. For example, parallel trap 402 may be used to defeat a combining function of the combiner at a frequency of 5 GHz because this combining function may create a signal loss. Also, for example, the combiner may not be affected by parallel trap 402 at a frequency of 2.4 GHz, but the combiner may have a 3 dB loss at 2.4 GHz. Parallel trap 402 may be added on a side of the combiner that is connected to directional coupler 204. Parallel trap 402 may be implemented near combiner input ports, such as combiner first input 404 and combiner second input 406.

In an embodiment, parallel trap 402 may be implemented by forming at least a pair of combiner traces 410 connected to combiner input ports (e.g., combiner first input 404 and combiner second input 406) and combiner output port 412. Portions of combiner traces 410 may be parallel with each other. Combiner traces 410 may be connected at combiner output port 412. Parallel trap 402 may further be implemented by forming protrusions 408 on combiner traces 410. A protrusion 408 may be formed on a first combiner trace 410, and another protrusion 408 may be formed on a second combiner trace 410. Protrusions 408 may be facing each other.

Combiner traces 410 may connect combiner input ports to combiner output port 412. A combiner trace 410 may be formed between combiner first input 404 and combiner output port 412, and another combiner trace 410 may be formed between combiner second input 406 and combiner output port 412.

Combiner first input 404 and combiner second input 406 of first combiner 206 may be connected to second input port 212 and first coupler output 218, respectively. Combiner first input 404 and combiner second input 406 of second combiner 208 may be connected to second coupler output 220 and fourth input port 216, respectively.

In an embodiment, parallel trap 402 may be implemented based on a predetermined quality (Q) factor. A Q factor may be predetermined for a range of operating frequencies. For example, parallel trap 402 may have a Q factor so that the combiner may cover a range of greater than 5 GHz and less than 5.5 GHz frequency band to eliminate the 3 dB loss at 5 GHz. An inductance in parallel trap 402 may be implemented with a PCB trace of the combiner. The higher the Q factor, the narrower the range of frequencies that the combiner may cover.

The combiner may be implemented with a combination of passive components including, but not limited to, capacitors 414, resistors 416, etc. Capacitors 414 may be connected or attached to a combiner trace 410 at or near combiner output 412. Resistors 416 may be connected or attached to protrusions 408 of parallel trap 402. Resistors 416 may be used to provide isolation between signals carried by combiner traces 410.

For example, the passive components (e.g., capacitors 414, resistors 416, etc.) may include discrete components. Also, for example, the passive components may include surface mount devices (SMDs) or any other type of devices.

As an example, capacitors 414 may have a capacitance of 1.0 picofarad (pF), which may be too large to form using an inter-plane capacitance and so a discrete component may be used for capacitors 414. As another example, two resistors 416 of 100 ohms (Ω) with a tolerance of 1% may be mounted on protrusions 408 and so discrete components may be added for the two resistors 416. Of course, other types of resistors and capacitors may be used instead, depending on the implementation.

The combiner may include a structure that has two combiner input ports (e.g., combiner first input 404 and combiner second input 406) and one output (e.g., combiner output 412). The combiner may have an inherent loss of power (e.g. ~3 dB). However, power levels in wireless integrated circuits (IC's) may be adjusted to compensate for the inherent loss.

4.3. Example Circuit

Figure 5:
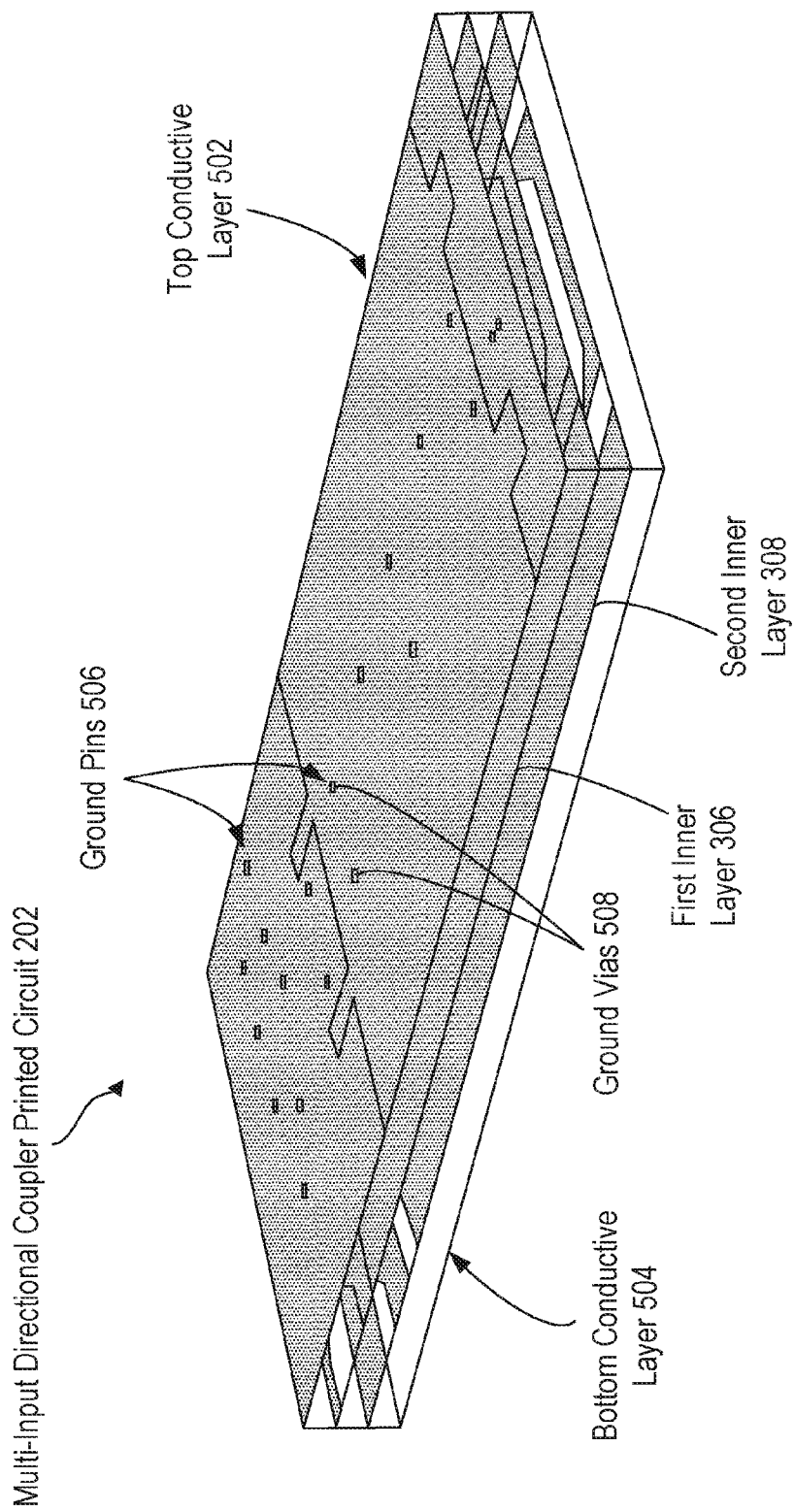
FIG. 5 is an isometric view of the multi-input directional coupler printed circuit, according to an embodiment.

FIG. 5 is an isometric view of multi-input directional coupler printed circuit 202, according to an embodiment. The isometric view depicts a three-dimensional (3D) view of an example structure of multi-input directional coupler printed circuit 202. FIG. 5 illustrates only one possible arrangement for multi-input directional coupler printed circuit 202. Other embodiments may include fewer, additional, or different elements, in varying arrangements.

In an embodiment, multi-input directional coupler printed circuit 202 may include, but is not limited to, a diplexer or any other devices that implement frequency-domain multiplexing. Multi-input directional coupler printed circuit 202 may be inherently shielded using top and bottom layers, such as top conductive layer 502 and bottom conductive layer 504. Top conductive layer 502 and bottom conductive layer 504 may be used as ground planes. Multi-input directional coupler printed circuit 202 may include inner layers, such as first inner layer 306 or second inner layer 308, in between top conductive layer 502 and bottom conductive layer 504. Top conductive layer 502 may be formed over first inner layer 306. First inner layer 306 may be formed over second inner layer 308. Second inner layer 308 may be formed over bottom conductive layer 504.

Portions of directional coupler 204 may utilize any number of inner layers of multi-input directional coupler printed circuit 202 for improved performance. For example, directional coupler 204 may use both inner layers, such as first inner layer 306 and second inner layer 308, due to lower insertion loss compared to using just one inner layer. Thus, there may not be any downside to using both inner layers.

Layers of multi-input directional coupler printed circuit 202 may have any spacing between each other. For example, adjacent layers of multi-input directional coupler printed circuit 202 (e.g., top conductive layer 502, first inner layer 306, second inner layer 308, bottom conductive layer 504, etc.) may be approximately equally-spaced from each other.

In an embodiment, the ground planes may include areas of conductive foils formed of a conductive material (e.g., copper, any other metals, a metallic compound, etc.) on a PCB. The ground planes may be connected to a power supply ground terminal and may serve as return paths for currents from a variety of components (e.g., directional coupler 204, first combiner 206, second combiner 208, etc.) on the PCB.

Ground pins 506 may be used to provide for multiple ground connections. Ground pins 506 may be connected to top conductive layer 502 or bottom conductive layer 504.

For example, ground pins 506 may include, but are not limited to, castellated pins or any other structures used for connection to ground planes.

Ground pins 506 may be connected or attached to ground vias 508, which are electrical connections between layers in a physical electronic circuit. Ground vias 508 may be formed through the planes of one or more adjacent layers of a PCB.

In an embodiment, edge radiation may occur at the edge of multi-input directional coupler printed circuit 202. For example, radiation may occur by currents in traces of a PCB. The currents may create electromagnetic fields that propagate through dielectric layers towards the edge of the PCB. These electromagnetic fields may radiate into the surrounding space of the PCB.

For example, the edge radiation may be minimized by using or routing additional traces formed with a conductive material (e.g., copper, any other metal, a metallic compound, etc.). The additional traces may be formed around the perimeter of multi-input directional coupler printed circuit 202. Also, for example, a string of vias may be formed around the periphery of multi-input directional coupler printed circuit 202 to short out ground planes to minimize the edge radiation. In an embodiment, connectors or cables may be attached on top conductive layer 502 or bottom conductive layer 504. For example, connectors may include U.FL connectors or any RF connectors for wireless signals. Also, for example, cables may include coaxial cables or any other types of interconnections that may be attached (e.g., soldered, etc.) to pads on top conductive layer 502 or bottom conductive layer 504.

4.4. Example Top Conductive Layer

Figure 6:
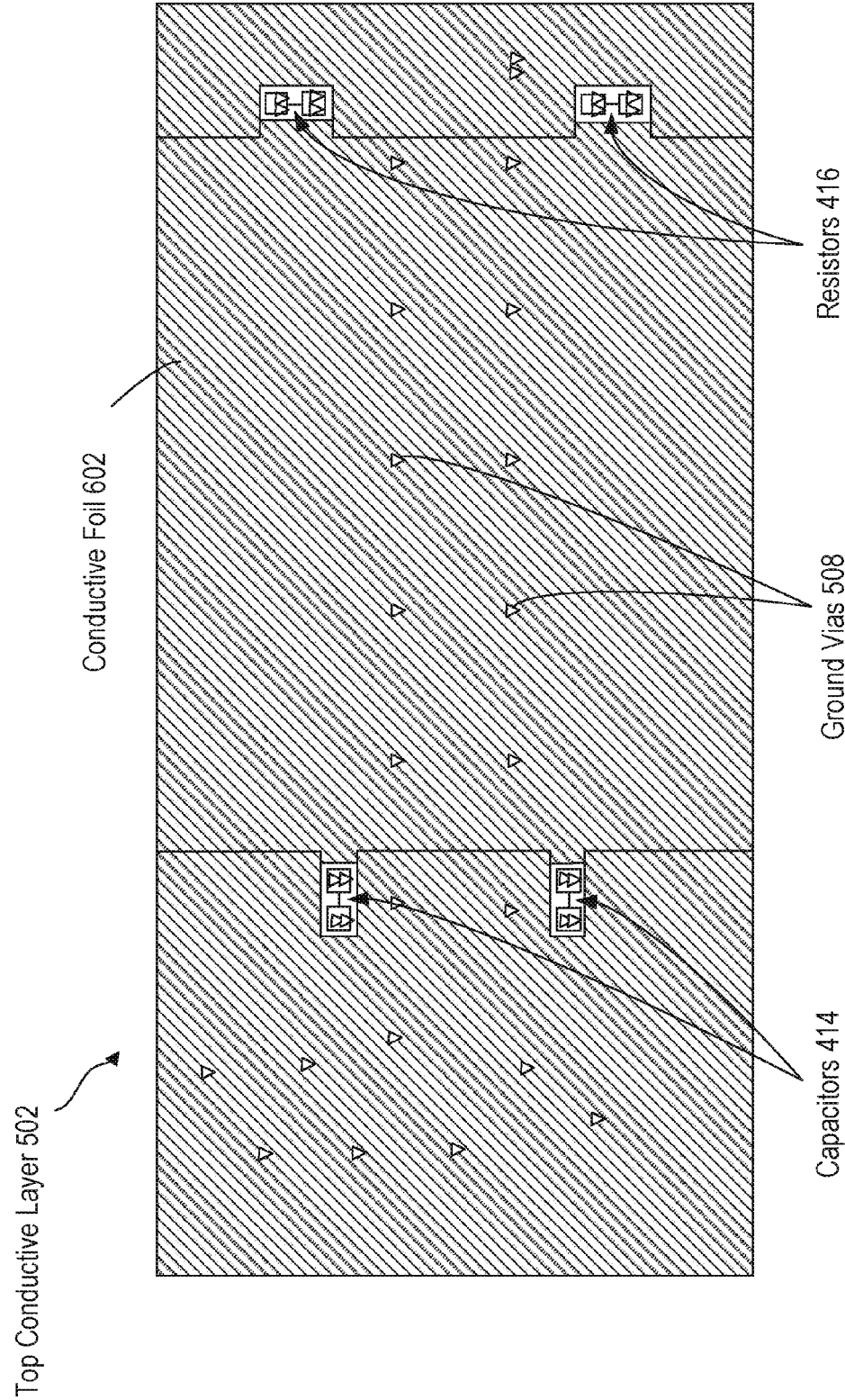
FIG. 6 is a top view of an example top conductive layer, according to an embodiment.

FIG. 6 is a top view of an example top conductive layer 502, according to an embodiment. The top view depicts an example of a structure of top conductive layer 502. Top conductive layer 502 may be formed with a conductive foil 602 used for ground except at the locations where passive components, such as capacitors 414, resistors 416, etc., are mounted. FIG. 6 illustrates only one possible arrangement for top conductive layer 502. Other embodiments may include fewer, additional, or different elements, in varying arrangements.

Capacitors 414 may be mounted over or attached to pads that are formed on top conductive layer 502. Resistors 416 may be mounted over or attached to pads that are formed on top conductive layer 502. The pads that are attached to resisters 416 may be electrically connected to protrusions 408. Resistors 416 may electrically connect protrusions 408 that are facing opposite to each other.

Any number of the passive components may be mounted on top conductive layer 502. For example, two capacitors 414 or two resistors 416 may be mounted over or attached to isolated pads formed on top conductive layer 502.

Top conductive layer 502 may be used as a ground plane except in the areas where the isolated pads are used to mount or attach the passive components. Ground vias 508 may be formed through the structure of multi-input directional coupler printed circuit 202. Ground vias 508 may be formed from top conductive layer 502 to bottom conductive layer 504. Ground vias 508 may be connected to pads or traces on first inner layer 306 or second inner layer 308 to provide ground to directional coupler 204, first combiner 206, second combiner 208, etc.

4.5. Example First Inner Layer

Figure 7:
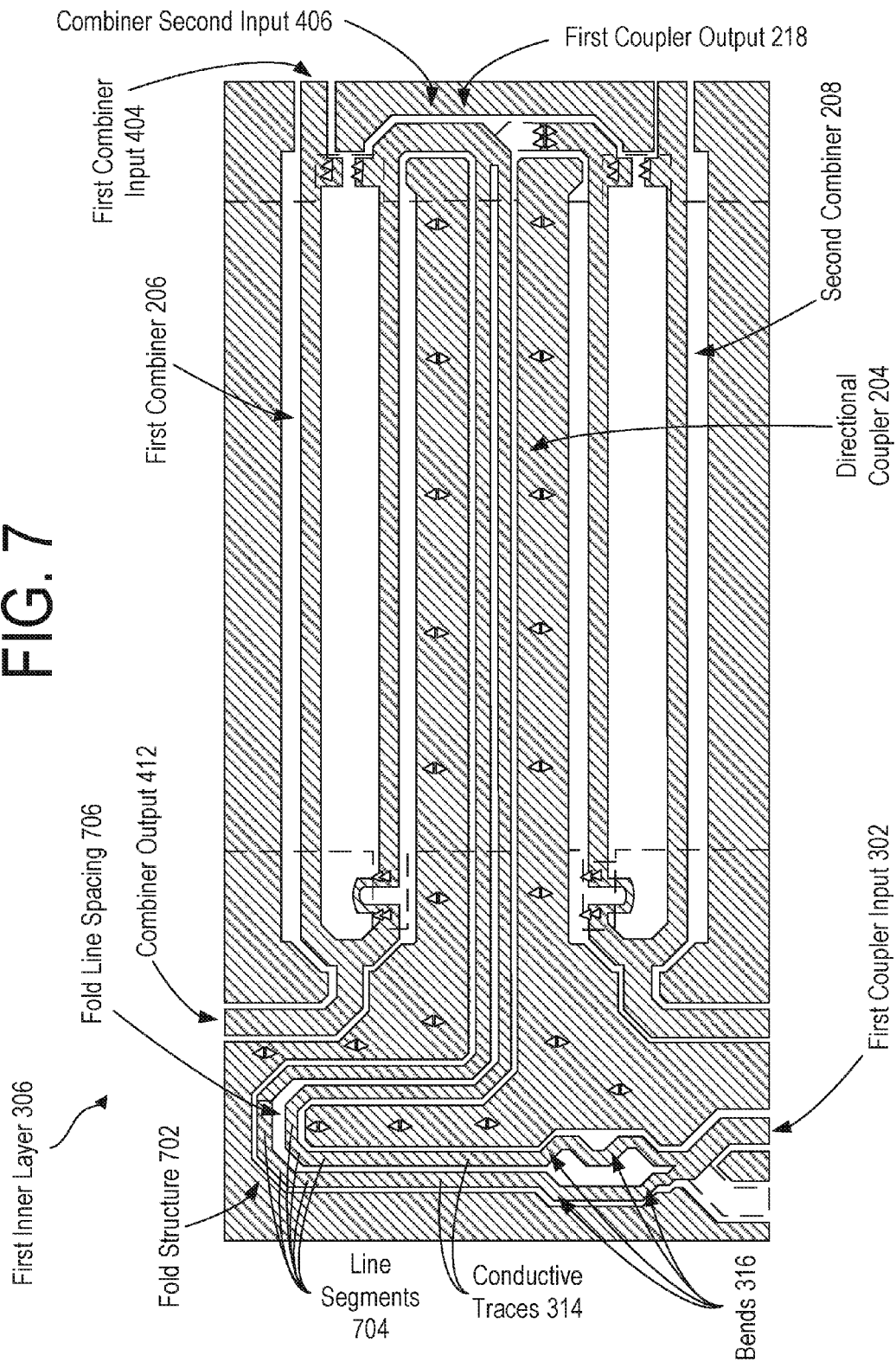
FIG. 7 is a top view of an example first inner layer, according to an embodiment.

FIG. 7 is a top view of an example first inner layer 306, according to an embodiment. The top view depicts an example of a structure of first inner layer 306. For example, first inner layer 306 may be formed immediately below top conductive layer 502 and thus may be referred to as Layer 2. FIG. 7 illustrates only one possible arrangement for first inner layer 306. Other embodiments may include fewer, additional, or different elements, in varying arrangements.

A combination of directional coupler 204, first combiner 206, second combiner 208, etc., may be formed on first inner layer 306. First combiner 206 or second combiner 208 may be formed only on first inner layer 306. In some embodiments, first combiner 206 or second combiner 208 may have poor performance when it is duplicated on second inner layer 308 and thus may not be formed on second inner layer 308.

First coupler input 302 of directional coupler 204 may be connected to first input port 210 of multi-input directional coupler printed circuit 202. Directional coupler 204 may be connected to first combiner 206. First coupler output 218 of directional coupler 204 may be connected to combiner second input 406 of first combiner 206. First combiner 206 may include combiner first input 404 and combiner output 412.

The top view depicts an example of a portion of directional coupler 204 having fold structure 702. In fold structure 702, directional coupler 204 may be folded so that a dimension of directional coupler 204 may be reduced for multi-input directional coupler printed circuit 202 to fit in a smaller footprint or a predefined land pattern on a circuit board.

In an embodiment, fold structure 702 may be formed with any number of line segments 704. Line segments 704 may be portions of conductive traces 314 that are straight or non-curve. Line segments 704 may abut each other. Line segments 704 may be at any angles with respect to each other.

Multi-input directional coupler printed circuit 202 may have any dimensions or thicknesses. For example, multi-input directional coupler printed circuit 202 may have a dimension of, but is not limited to, approximately 0.850"× 0.400". Also, for example, multi-input directional coupler printed circuit 202 may have a thickness of, but is not limited to, approximately 0.063". However, in other embodiments, the dimensions or the thicknesses of multi-input directional coupler printed circuit 202 may vary.

In an embodiment, directional coupler 204 may be implemented with both conductive traces 314 formed with bends 316. In an embodiment, directional coupler 204 may be implemented with one of the conductive traces 314 formed with a higher number of bends 316 than another of the conductive traces 314.

In an embodiment, fold structure 702 of directional coupler 204 may include fold line spacing 706 between conductive traces 314 at a location where directional coupler 204 is folded. Fold line spacing 706 may include a gap directly between adjacent conductive traces 314 in fold structure 702. As fold line spacing 706 widens, the length difference between conductive traces 314 in fold structure 702 may become greater.

Fold line spacing 706 may be greater than any other spacing between adjacent conductive traces 314 outside fold structure 702. Conductive traces 314 may be formed with fold line spacing 706 in fold structure 702 for isolation of conductive traces 314, thus creating a difference between lengths of trace paths 310 for the double-notch.

The double-notch may create a wider notch to compensate for variations in the PCB materials and physical dimensions. The double-notch may create the wider notch by increasing a predefined range of frequencies within which directional coupler 204 can pass the signals. The double-notch may be implemented so that the notch from the combiners may fit within the double-notch of directional coupler 204.

The structure of directional coupler 204 may have any length. For example, the structure of directional coupler 204 may be approximately, but not limited to, 1.4" long to implement the double-notch. With this length, the structure of directional coupler 204 may be folded. However, in other embodiments, the length of directional coupler 204 may vary.

4.6. Example Second Inner Layer

Figure 8:
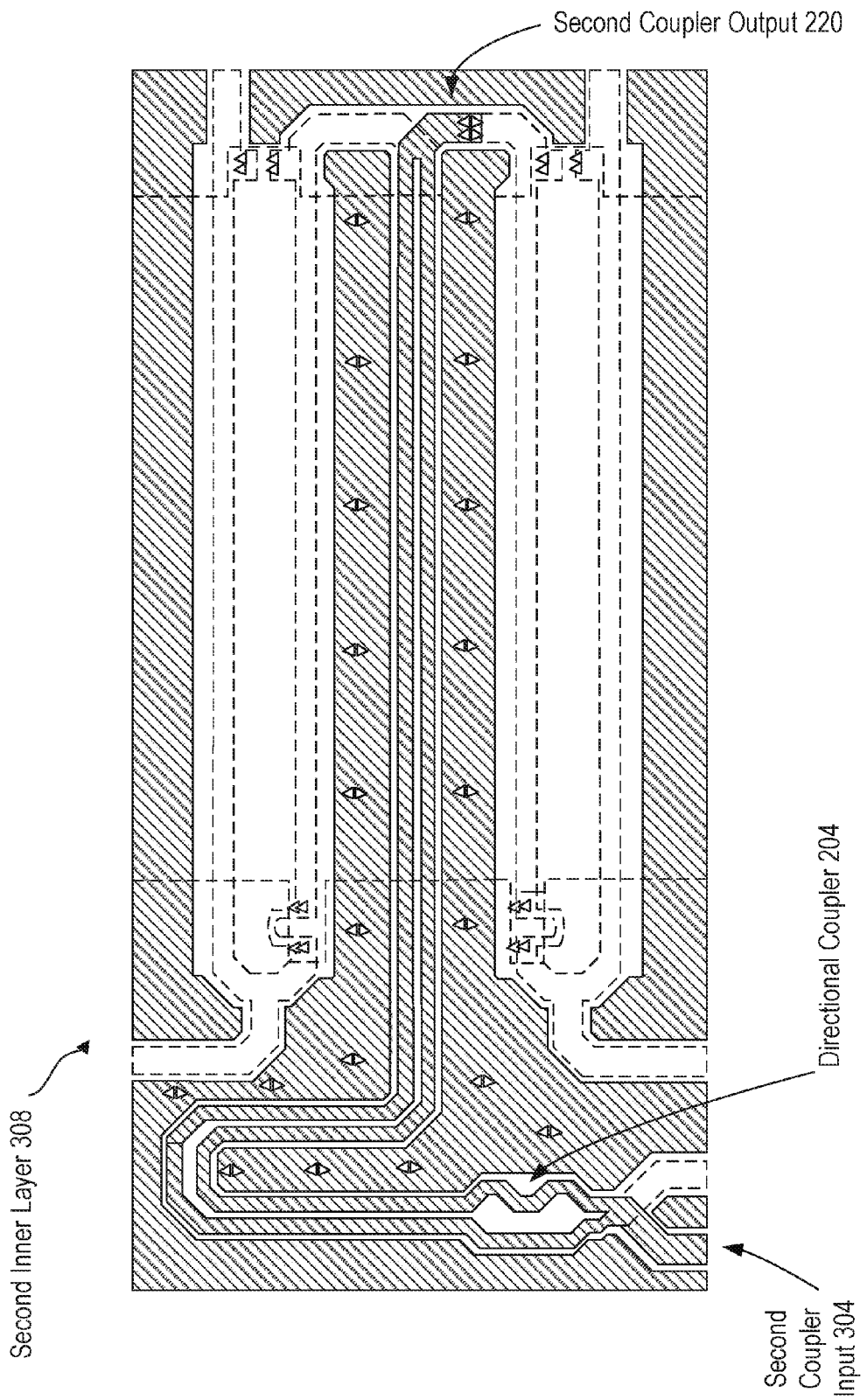
FIG. 8 is a top view of an example second inner layer, according to an embodiment.

FIG. 8 is a top view of an example second inner layer 308, according to an embodiment. The top view depicts an example of a structure of second inner layer 308. For example, second inner layer 308 may be formed immediately below Layer 2, such as first inner layer 306, and thus may be referred to as Layer 3. FIG. 8 illustrates only one possible arrangement for second inner layer 308. Other embodiments may include fewer, additional, or different elements, in varying arrangements.

Portions of directional coupler 204 may utilize all or a combination of inner layers, such as first inner layer 306 and second inner layer 308, for improved performance. For example, directional coupler 204 may use both inner layers, such as first inner layer 306 and second inner layer 308, due to lower insertion loss compared to using just one inner layer. Thus, there may not be any downside to using both inner layers for directional coupler 204.

Directional coupler 204 may include second coupler input 304. Second coupler input 304 may be connected to third input port 214 of multi-input directional coupler printed circuit 202. Second coupler output 220 may be connected to combiner first input 404 of second combiner 208.

4.7. Example Portion of Directional Coupler

Figure 9:
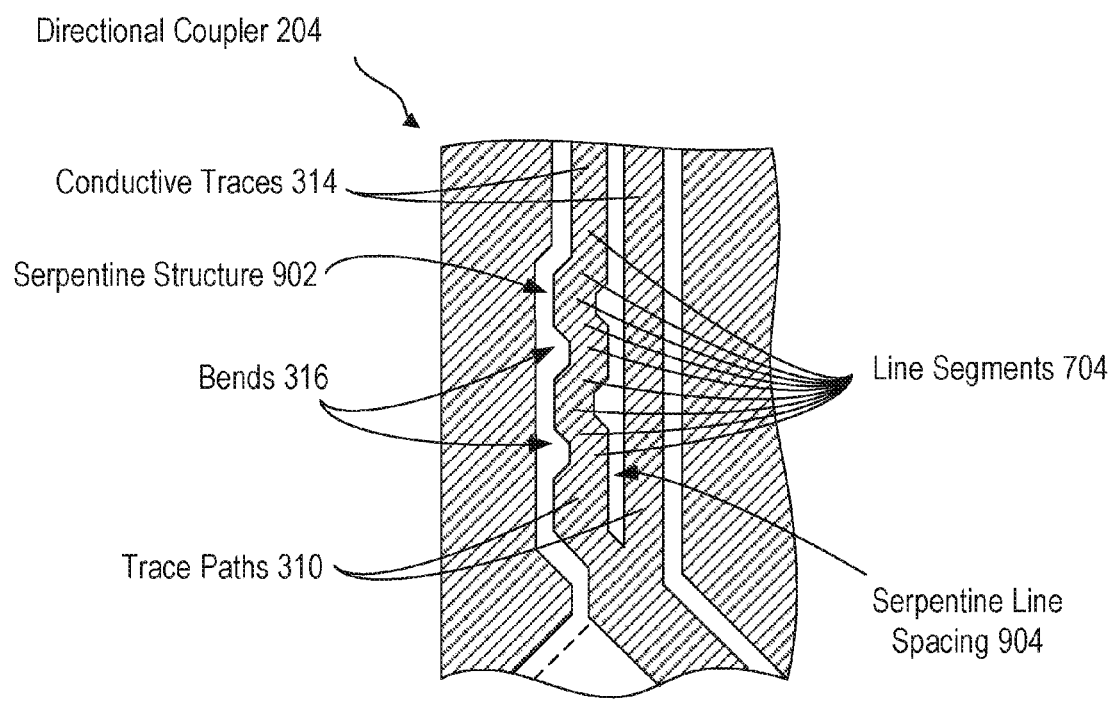
FIG. 9 is a top view of an example portion of directional coupler in which the double-notch is achieved, according to an embodiment.

FIG. 9 is a top view of an example portion of directional coupler 204 in which the double-notch is achieved, according to an embodiment. The top view depicts an example of a structure of directional coupler 204 with bends 316. Bends 316 may be formed using line segments 704 of a conductive trace 314 for the curves. FIG. 9 illustrates only one possible arrangement for directional coupler 204. Other embodiments may include fewer, additional, or different elements, in varying arrangements.

In an embodiment, conductive traces 314 may be implemented with bends 316 to increase a length difference between lengths of conductive traces 314. In an embodiment, line segments 704 of a conductive trace 314 may be separated further from another conductive trace 314 to increase the length difference between the conductive traces 314. For illustrative purposes, a conductive trace 314 is shown having approximately ten bends 316, although it is understood that the conductive trace 314 may include any number of bends 316 to create predetermined path length 312 of the conductive trace 314 for signal isolation.

A portion of directional coupler 204 may include serpentine structure 902. Serpentine structure 902 may include a number of conductive traces 314 on a PCB that squiggle back and forth. Serpentine structure 902 may include line segments 704 that are formed at any angles with respect to each other.

In an embodiment, line segments 704 in serpentine structure 902 may form a serpentine shape of a portion of a conductive trace 314. The serpentine shape may create a path length difference between conductive traces 314. This path difference may create the double-notch. In an embodiment, a conductive trace 314 may be formed with bends 316, while another conductive trace 314 may be formed without any bends 316. A bend may be formed with two line segments 704 at any angle between the two line segments 704.

Conductive traces 314 may be formed with two separate trace paths 310. By separating trace paths 310, there may be less coupling issues, such as crosstalk or mutual coupling between adjacent traces on a PCB. A double-notch response may be created when there is a path difference between conductive traces 314.

A number of bends 316 of a conductive trace 314 may be formed based on a predetermined impedance. For example, the predetermined impedance may include, but is not limited to, a constant 50-ohm impedance. However, in other embodiments the predetermined impedance may vary.

In an embodiment, serpentine structure 902 may include serpentine line spacing 904. Serpentine line spacing 904 may include a gap directly between adjacent conductive traces 314 in serpentine structure 902. As serpentine line spacing 904 widens, the length difference between the lengths of conductive traces 314 in serpentine structure 902 may become greater. Serpentine line spacing 904 may allow for an electrical path difference that creates the double-notch.

4.8. Example Process Flow

FIG. 10 illustrates an example process flow, in accordance with one or more embodiments. In some embodiments, a system (e.g., 100) is performed through one or more computing devices or units. FIG. 10 illustrates only one possible flow for the system. Other embodiments may include fewer, additional, or different elements, in varying arrangements. Moreover, it will be recognized that the sequence of blocks is for convenience in explaining the process flow only, as the blocks themselves may be performed in various orders and/or concurrently.

In block 1002, the system generates a first signal using a first wireless service. For example, a first networking component of the system may generate a wireless signal that encodes a specific type of communication, such as a Bluetooth packet, etc. The first signal may be fed to a first input port, such as first input port 210. Examples of the first networking component may include, without limitation, computer 102, display device 104, entertainment system 106, mobile device 108, access point 110, etc.

In block 1004, the system generates a second signal using a second wireless service different from the first wireless service. For example, a second networking component of the system may generate a wireless signal that encodes a specific type of communication, such as an 802.11 frame, an Ethernet or IP packet, etc. The second signal may be fed to a second input port, such as second input port 212. Also, for example, the second signal may be transmitted over the 2.4 GHz radio bands of the 802.11 protocol. Examples of the second networking component may include, without limitation, computer 102, display device 104, entertainment system 106, mobile device 108, access point 110, etc.

In block 1006, the system generates a third signal using a third wireless service different from the first wireless service and the second wireless service. For example, a third networking component of the system may generate a wireless signal that encodes a specific type of communication, such as a RF4CE frame, etc. The third signal may be fed to a third input port, such as third input port 214. Examples of the third networking component may include, without limitation, computer 102, display device 104, entertainment system 106, mobile device 108, access point 110, etc.

In block 1008, the system generates a fourth signal using a fourth wireless service different from the first wireless service, the second wireless service, and the third wireless service. For example, a fourth networking component of the system may generate a wireless signal that encodes a specific type of communication, such as an 802.11 frame, an Ethernet or IP packet, etc. The fourth signal may be fed to a fourth input port, such as fourth input port 216. In an embodiment, the fourth wireless service may use the same protocol as, but different frequencies from, those of the second wireless service. For example, the fourth signal may be transmitted over the 5 GHz radio bands of the 802.11 protocol. Examples of the fourth networking component may include computer 102, display device 104, entertainment system 106, mobile device 108, access point 110, etc.

In block 1010, the system generates a first coupled signal using a directional coupler, such as directional coupler 204. The first coupled signal may be generated by coupling the first signal to a first coupler output, such as first coupler output 218. The first signal may be coupled using a first coupler circuit with two trace paths, such as trace paths 310. In an embodiment, one of the trace paths may include a serpentine structure, such as serpentine structure 902, which may create a path length difference between two conductive traces, such as conductive traces 314. The path length difference may create a double-notch that allows signals of two different frequency bands to pass.

In block 1012, the system generates a second coupled signal using the directional coupler. The second coupled signal may be generated by coupling the third signal to a second coupler output, such as second coupler output 220. The third signal may be coupled using a second coupler circuit with two trace paths, such as trace paths 310. In an embodiment, one of the trace paths may include a serpentine structure, such as serpentine structure 902, which may create a path length difference between two conductive traces, such as conductive traces 314. The path length difference may create a double-notch that allows signals of two different frequency bands to pass.

In block 1014, the system generates a first combined signal using a first combiner, such as first combiner 206. The first combined signal may be generated by combining the second signal and the first coupled signal.

In block 1016, the system generates a second combined signal using a second combiner, such as second combiner 208. The second combined signal may be generated by combining the second coupled signal and the fourth signal.

In block 1018, the system sends the first combined signal to a first antenna, such as first antenna 226, that transmits the first combined signal.

In block 1020, the system sends the second combined signal to a second antenna, such as second antenna 228, that transmits the second combined signal with reduced or no interference between the services or between the antennas.

In one or more embodiments, any of the networking components described in the system above may be the same as or different from each other or other components in the system. For example, the second networking component and the fourth networking component may be the same component. Also, for example, the first networking component may be different from the third networking component. In an embodiment, some or all of the above blocks are optional. For instance, some or all of blocks 1006, 1008, 1012, 1016, and 1020 may be optional.

5.0. EXAMPLE EMBODIMENTS

Examples of some embodiments are represented, without limitation, in the following clauses:

According to an embodiment, a system comprises: a directional coupler configured to receive a first signal for a first wireless service and generate a first coupled signal based on the first signal; and a first combiner configured to receive a second signal for a second wireless service different from the first wireless service, generate a first combined signal based on the second signal and the first coupled signal, and send the first combined signal to a first antenna configured to transmit the first combined signal.

In an embodiment, wherein the directional coupler includes a serpentine structure with a conductive trace that routes the first signal.

In an embodiment, wherein the first combiner includes a parallel trap configured to reduce a power loss of the first combined signal at a frequency.

In an embodiment, wherein the directional coupler includes a fold structure with conductive traces having line segments, the line segments creating a difference between lengths of the conductive traces, the conductive traces connected with each other, and the conductive traces routing the first signal.

In an embodiment, wherein: the directional coupler is further configured to receive a third signal for a third wireless service different from the first wireless service and the second wireless service, and generate a second coupled signal based on the third signal; and the system further comprises a second combiner configured to receive a fourth signal for a fourth wireless service different from the first wireless service, the second wireless service, and the third wireless service, generate a second combined signal based on the fourth signal and the second coupled signal, and send the second combined signal to a second antenna configured to transmit the second combined signal.

In an embodiment, wherein the first wireless service is for a Bluetooth standard, the second wireless service is for an 802.11 standard at a frequency of approximately 2.4 GHz, the third wireless service is for a Radio Frequency for Consumer Electronics standard, and the fourth wireless service is for an 802.11 standard at a frequency of approximately 5 GHz.

In an embodiment, wherein the directional coupler includes a stripline.

According to an embodiment, a system comprises: a top conductive layer connected to ground; a directional coupler configured to receive a first signal for a first wireless service and generates a first coupled signal based on the first signal; a first combiner configured to receive a second signal for a second wireless service different from the first wireless service, generate a first combined signal based on the second signal and the first coupled signal, and send the first combined signal to a first antenna configured to transmits the first combined signal; and a bottom conductive layer connected to ground and below the top conductive layer; and wherein the directional coupler and the first combiner are between the top conductive layer and the bottom conductive layer.

In an embodiment, wherein the directional coupler includes a serpentine structure with a first conductive trace and a second conductive trace connected to the first conductive trace, the first conductive trace having bends to create a difference between lengths of the first conductive trace and the second conductive trace, and the first conductive trace and the second conductive trace routing the first signal.

In an embodiment, wherein the first combiner includes a parallel trap configured to reduce a power loss of the first combined signal at a frequency, the parallel trap having protrusions and a resistor connected to the protrusions.

In an embodiment, the directional coupler includes a fold structure with conductive traces having line segments and a line spacing, the line segments creating a difference between lengths of the conductive traces, the line spacing between the conductive traces, the conductive traces connected with each other, and the conductive traces routing the first signal.

In an embodiment, wherein: the directional coupler is further configured to receive a third signal for a third wireless service different from the first wireless service and the second wireless service, and generate a second coupled signal based on the third signal; and the system further comprising a second combiner configured to receive a fourth signal for a fourth wireless service different from the first wireless service, the second wireless service, and the third wireless service, generate a second combined signal based on the fourth signal and the second coupled signal, and send the second combined signal to a second antenna configured to transmit the second combined signal.

In an embodiment, wherein the first wireless service is for a Bluetooth standard, the second wireless service is for an 802.11 standard at a frequency of approximately 2.4 GHz, the third wireless service is for a Radio Frequency for Consumer Electronics standard, and the fourth wireless service is for an 802.11 standard at a frequency of approximately 5 GHz.

In an embodiment, wherein the directional coupler includes a stripline with conductive layers and approximately equal spacing between the conductive layers.

According to an embodiment, a method comprises: receiving, by a directional coupler, a first signal for a first wireless service; generating, by the directional coupler, a first coupled signal based on the first signal; receiving, by a first combiner, the first coupled signal and a second signal for a second wireless service different from the first wireless service; generating, by the first combiner, a first combined signal based on the second signal and the first coupled signal; and sending, by the first combiner, the first combined signal by the first combiner to a first antenna configured to transmit the first combined signal.

In an embodiment, wherein the directional coupler includes a serpentine structure with a conductive trace that routes the first signal.

In an embodiment, wherein the first combiner includes a parallel trap that reduces a power loss of the first combined signal at a frequency.

In an embodiment, wherein the directional coupler includes a fold structure with conductive traces having line segments, the line segments creating a difference between lengths of the conductive traces, the conductive traces connected with each other, and the conductive traces routing the first signal.

In an embodiment, the method further comprises: receiving, by the directional coupler, a third signal for a third wireless service different from the first wireless service and the second wireless service; generating, by the directional coupler, a second coupled signal by the directional coupler based on the third signal; receiving, by a second combiner, the second coupled signal and a fourth signal using a fourth wireless service different from the first wireless service, the second wireless service, and the third wireless service; generating, by the second combiner, a second combined signal based on the fourth signal and the second coupled signal; and sending, by the second combiner, the second combined signal to a second antenna configured to transmit the second combined signal.

In an embodiment, wherein the first wireless service is for a Bluetooth standard, the second wireless service is for an 802.11 standard at a frequency of approximately 2.4 GHz, the third wireless service is for a Radio Frequency for Consumer Electronics standard, and the fourth wireless service is for an 802.11 standard at a frequency of approximately 5 GHz.

According to an embodiment, a method comprises: forming a multi-input directional coupler printed circuit having a first input port, a second input port, and a first output port, including: forming a directional coupler having a first coupler input, a first coupler output, and first conductive traces, the first coupler input connected to the first input port, the first conductive traces connected with each other at the first coupler input and the first coupler output, the first conductive traces parallel with each other between the first coupler input and the first coupler output; and forming a first combiner in series with the directional coupler, the first combiner having a first combiner first input, a first combiner second input, a first combiner output, and first combiner traces, the first combiner first input connected to the second input port, the first combiner second input connected to the first coupler output, the first combiner traces parallel with each other at the first combiner first input and the first combiner second input, the first combiner traces connected at the first combiner output, the first combiner output connected to a first antenna.

In an embodiment, wherein forming the directional coupler includes forming a serpentine structure with one of the first conductive traces longer than another of the first conductive traces.

In an embodiment, wherein forming the first combiner includes forming a parallel trap having protrusions facing each other.

In an embodiment, wherein forming the directional coupler includes forming a fold structure with the first conductive traces having line segments abutting at an angle with respect to each other.

In an embodiment, wherein: forming the multi-input directional coupler printed circuit includes forming the multi-input directional coupler printed circuit having a third input port, a fourth input port, and a second output port, including: forming the directional coupler having a second coupler input, a second coupler output, and second conductive traces, the second coupler input connected to the third input port, the second conductive traces connected with each other at the second coupler input and the second coupler output, the second conductive traces parallel with each other between the second coupler input and the second coupler output; and forming a second combiner in series with the directional coupler, the second combiner having a second combiner first input, a second combiner second input, a second combiner output, and second combiner traces, the second combiner first input connected to the second coupler output, the second combiner second input connected to the fourth input port, the second combiner traces parallel with each other at the second combiner first input and the second combiner second input, the second combiner traces connected at the second combiner output, the second combiner output connected to a second antenna.

In an embodiment, wherein forming the multi-input directional coupler printed circuit includes: forming a first inner layer having a portion of the directional coupler, the first combiner, and the second combiner; and forming a second inner layer adjacent to the first inner layer, the second inner layer having another portion of the directional coupler.

Other examples of these and other embodiments are found throughout this disclosure.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
    a directional coupler configured to receive a first signal for a first wireless service and generate a first coupled signal based on the first signal;
    the directional coupler is further configured to receive a third signal for a third wireless service different from the first wireless service and a second wireless service, and generate a second coupled signal based on the third signal;
    a first combiner configured to receive a second signal for the second wireless service different from the first wireless service, generate a first combined signal based on the second signal and the first coupled signal, and send the first combined signal to a first antenna configured to transmit the first combined signal; and
    the system further comprises a second combiner configured to receive a fourth signal for a fourth wireless service different from the first wireless service, the second wireless service, and the third wireless service, generate a second combined signal based on the fourth signal and the second coupled signal, and send the second combined signal to a second antenna configured to transmit the second combined signal.

2. The system as recited in claim 1, wherein the directional coupler includes a serpentine structure with a conductive trace that routes the first signal.

3. The system as recited in claim 1, wherein the first combiner includes a parallel trap configured to reduce a power loss of the first combined signal at a frequency.

4. The system as recited in claim 1, wherein the directional coupler includes a fold structure with conductive traces having line segments, the line segments creating a difference between lengths of the conductive traces, the conductive traces connected with each other, and the conductive traces routing the first signal.

5. The system as recited in claim 1, wherein the first wireless service is for a Bluetooth standard, the second wireless service is for an 802.11 standard at a frequency of approximately 2.4 GHz, the third wireless service is for a Radio Frequency for Consumer Electronics standard, and the fourth wireless service is for an 802.11 standard at a frequency of approximately 5 GHz.

6. The system as recited in claim 1, wherein the directional coupler includes a stripline.

7. The system as recited in claim 1, wherein the first combiner includes a parallel trap configured to reduce a power loss of the first combined signal at a frequency, the parallel trap having protrusions and a resistor connected to the protrusions.

8. A system comprising:
    a top conductive layer connected to ground;
    a directional coupler configured to receive a first signal for a first wireless service and generate a first coupled signal based on the first signal;
    the directional coupler is further configured to receive a third signal for a third wireless service different from the first wireless service and a second wireless service, and generate a second coupled signal based on the third signal;
    a first combiner configured to receive a second signal for the second wireless service different from the first wireless service, generate a first combined signal based on the second signal and the first coupled signal, and send the first combined signal to a first antenna configured to transmit the first combined signal;
    the system further comprises a second combiner configured to receive a fourth signal for a fourth wireless service different from the first wireless service, the second wireless service, and the third wireless service, generate a second combined signal based on the fourth signal and the second coupled signal, and send the second combined signal to a second antenna configured to transmit the second combined signal;
    a bottom conductive layer connected to ground and below the top conductive layer; and
    wherein the directional coupler, the first combiner, and second combiner are between the top conductive layer and the bottom conductive layer.

9. The system as recited in claim 8, wherein the directional coupler includes a serpentine structure with a first conductive trace and a second conductive trace connected to the first conductive trace, the first conductive trace having bends to create a difference between lengths of the first conductive trace and the second conductive trace, and the first conductive trace and the second conductive trace routing the first signal.

10. The system as recited in claim 8, wherein the first wireless service is for a Bluetooth standard, the second wireless service is for an 802.11 standard at a frequency of approximately 2.4 GHz, the third wireless service is for a Radio Frequency for Consumer Electronics standard, and the fourth wireless service is for an 802.11 standard at a frequency of approximately 5 GHz.

11. A method comprising:
receiving, by a directional coupler, a first signal for a first wireless service;
generating, by the directional coupler, a first coupled signal based on the first signal;
receiving, by a first combiner, the first coupled signal and a second signal for a second wireless service different from the first wireless service;
generating, by the first combiner, a first combined signal based on the second signal and the first coupled signal;
sending, by the first combiner, the first combined signal by the first combiner to a first antenna configured to transmit the first combined signal;
receiving, by the directional coupler, a third signal for a third wireless service different from the first wireless service and the second wireless service;
generating, by the directional coupler, a second coupled signal by the directional coupler based on the third signal;
receiving, by a second combiner, the second coupled signal and a fourth signal using a fourth wireless service different from the first wireless service, the second wireless service, and the third wireless service;
generating, by the second combiner, a second combined signal based on the fourth signal and the second coupled signal; and
sending, by the second combiner, the second combined signal to a second antenna configured to transmit the second combined signal.

12. The method as recited in claim 11, wherein the directional coupler includes a serpentine structure with a conductive trace that routes the first signal.

13. The method as recited in claim 11, wherein the first combiner includes a parallel trap that reduces a power loss of the first combined signal at a frequency.

14. The method as recited in claim 11, wherein the directional coupler includes a fold structure with conductive traces having line segments, the line segments creating a difference between lengths of the conductive traces, the conductive traces connected with each other, and the conductive traces routing the first signal.

15. The method as recited in claim 11, wherein the first wireless service is for a Bluetooth standard, the second wireless service is for an 802.11 standard at a frequency of approximately 2.4 GHz, the third wireless service is for a Radio Frequency for Consumer Electronics standard, and the fourth wireless service is for an 802.11 standard at a frequency of approximately 5 GHz.

* * * * *